ns Patent Office 3,310,465
Patented Mar. 21, 1967

3,310,465
2-CYANOALLYL ESTERS OF DITHIOCARBAMIC ACID AS SOIL FUNGICIDES
Mason M. Turner, Modesto, Calif., assignor to Shell Oil Company, New York, N.Y., a corporation of Delaware
No Drawing. Filed Aug. 7, 1964, Ser. No. 388,272
3 Claims. (Cl. 167—30)

This invention relates generally to fungicidal dithiocarbamates. It is particularly concerned with fungicidal compositions which are useful for the control of noxious soil microorganisms, especially soil fungi, and to a method for the treatment of agricultural soils, inhabited by phytopathogenic soil-borne fungi, in order to protect plants against attack by these pathogens.

Many of the organisms which form part of the diverse complex that inhabit the soil subsist on living plants. Many injure the roots and other underground portions, others attack the crown of the plant, while still others are capable of damaging the stem and other above-ground portions of the plant. When plants are grown year after year in the same soil, the injury by soil pathogens is most likely to become more serious the longer the land is in cultivation, because the ready food supply leads to building of the pathogens.

Attempts have been made to control soil fungi by suitable crop rotation by the elimination of weeds which serve as hosts for the disease organisms and by the propagation of resistant varieties of crops. These, and other cultural practices, have tended to reduce the damage of soil pathogens but have not fully met the present needs of intensive agriculture. The use of chemicals has met with some success but has been confined to high value crops. The major chemicals of importance for field application to soil have been the more volatile substances which penetrate well into the soil spaces, exert their toxic action as a vapor, then volatilize from the soil prior to planting of the crop. High dosages of these compounds are generally required, and they are relatively expensive. Furthermore, there is the danger that if the chemical has not left the soil, it may be phytotoxic to the crop.

There now has been discovered a new class of chemicals which are remarkably effective as soil fungicides but are not phytotoxic at the fungicidally effective dosages. These are fungitoxic to a broad spectrum of noxious soil fungi and can be used with safety with respect to injury of the crop to be protected. These chemicals because of their low effective concentrations will provide fungus control at much lower dosage levels than the conventional volatile materials. This should permit chemical control of soil fungi for crops for which heretofore no effectively economic control has been possible.

The compounds of this invention have been found effective on many of the more important genera of fungi which cause rot and damping-off of plants. These include species of Pythium, Verticillium, Phytophthora, Rhizoctonia, Fusarium, Thielaviopsis.

The compounds of this invention are furthermore active against many species of fungi which attack the foilage of plants. They could be useful both as eradicants and protectants.

These effective new fungicides are generally characterized as dithiocarbamates having a 2-cyanoallyl group bonded to the nitrogen atom and an aryl group is bonded to the sulfur atom. They may be represented by the formula:

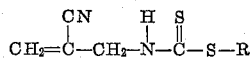

wherein R represents aryl of 6–14 carbon atoms. The aryl may be unsubstituted or substituted. When substituted, each substitutent may be selected from one to a plurality of middle halogen (bromine or chlorine), alkyl of 1–5 carbon atoms, alkoxy of 1–5 carbon atoms, hydroxy, nitro, amino, (—NH$_2$), monoalkylamino of 1–4 carbon atoms, and a dialkylamino of 2–8 carbon atoms.

Especially active as soil fungicides, and therefore preferred are the dithiocarbamates wherein R is alkylphenyl where the alkyl group is straight-chain or branched and contains from 1 to 10 carbon atoms. Still another preferred class because of high activity to soil organisms are those compounds of the invention where R is middle halo- (chloro- or bromo-) phenyl. Especially active compounds are where R is phenyl, o-methylphenyl and p-chlorophenyl, respectively.

The aryl cyanoallyl dithiocarbamates of the invention may be prepared by reacting a 2-cyanoallylisothiocyanate with the appropriate aryl or substituted aryl mercaptan according to the following equation:

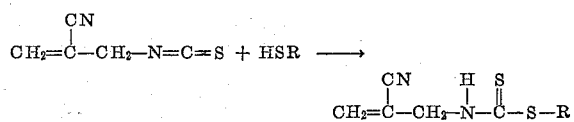

wherein R is as hereinbefore defined.

Representative 2-cyanoallyl esters of dithiocarbamic acid active as fungicides according to this invention include, for example 2-chlorophenyl (2-cyanoallyl)-dithiocarbamate;
3-chlorophenyl (2-cyanoallyl)-dithiocarbamate;
2,4-dichlorophenyl (2-cyanoallyl)-dithiocarbamate;
2,6-dichlorophenyl (2-cyanoallyl)-dithiocarbamate;
2-bromophenyl (2-cyanoallyl)-dithiocarbamate;
2,6-dibromophenyl (2-cyanoallyl)-dithiocarbamate;
2-chloro-6-bromophenyl (2-cyanoallyl)-dithiocarbamate;
4-tolyl (2-cyanoallyl)-dithiocarbamate;
3-tolyl (2-cyanoallyl)-dithiocarbamate;
2-methoxyphenyl (2-cyanoallyl)-dithiocarbamate;
4-methoxyphenyl (2-cyanoallyl)-dithiocarbamate;
2,6-dimethoxyphenyl (2-cyanoallyl)-dithiocarbamate;
4-ethoxyphenyl (2-cyanoallyl)-dithiocarbamate;
4-hydroxyphenyl (2-cyanoallyl)-dithiocarbamate;
2,6-dihydroxyphenyl (2-cyanoallyl)-dithiocarbamate;
4-nitrophenyl (2-cyanoallyl)-dithiocarbamate;
3,5-dinitrophenyl (2-cyanoallyl)-dithiocarbamate;
2,4,5-trinitrophenyl (2-cyanoallyl)-dithiocarbamate;
4-aminophenyl (2-cyanoallyl)-dithiocarbamate;
2-naphthyl (2-cyanoallyl)-dithiocarbamate;
4,8-dichloro-2-naphthyl (2-cyanoallyl)-dithiocarbamate;
3,6-dinitro-2-naphthyl (2-cyanoallyl)-dithiocarbamate;
2-anthryl (2-cyanoallyl)-dithiocarbamate;
9-methoxy-2-anthryl (2-cyanoallyl)-dithiocarbamate;
and the like.

To illustrate the manner in which the invention may be carried out, the following preparations and fungicidal tests are presented as examples. It is to be understood that the examples are for purposes of illustration only, and that the invention is not to be regarded as limited to any of the specific conditions cited therein.

*Example I.—p-Chlorophenyl (2-cyanoallyl)-dithiocarbamate*

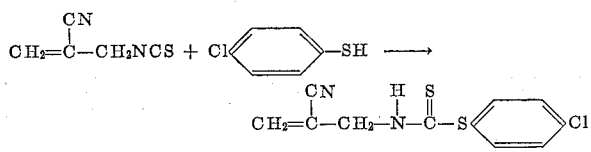

To a solution of 0.1 mole of p-chlorobenzenethiol in 25 milliliters of ether in the presence of 5 milliliters of pyridine was added 0.1 mole of 2-cyanoallylisothiocyanate. The reaction mixture was stirred and kept between 20–35° C. for 1 hour. The reaction mixture was filtered and the desired product was recrystallized from methanol. Yield was 80%. The structure was established by elemental analysis, percent by weight: (M.P. 146–147° C.).

Calculated: Cl, 13.2; S, 23.8. Found: Cl, 13.4; S, 23.0.

*Example II.—Phenyl (2-cyanoallyl)-dithiocarbamate*

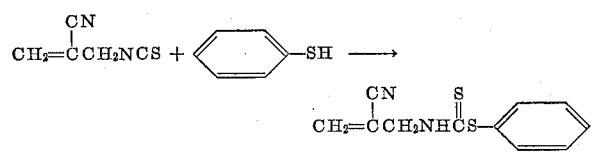

A solution of 22.0 g. (0.2 mole) of benzenethiol and 10 ml. of pyridine in 60 ml. of anhydrous ether was cooled in an ice bath while 24.8 g. (0.2 mole) of 2-cyanoallyl isothiocyanate was added. This solution deposited a crystalline precipitate upon standing a few hours at room temperature. This precipitate was filtered and recrystallized from methanol to yield 31 g. (67%), M.P. 106–108°, of phenyl (-cyanoallyl)-dithiocarbamate.

*Analysis.*—Calculated: N, 12.0%; S, 27.4%. Found: N, 12.1%; S, 27.2%.

*Example III.—Effectiveness of cyanoallyl dithiocarbamates as soil fungicides*

The compounds are evaluated by impregnating the compound on clay granules then blending the granules with soil naturally infested with root rotting organisms. The soil is then transferred into small plant pots. Indicator plants are next planted in the treated soil. Observations are made in three weeks on the germination and vigor of the plants. The roots are washed free of soil and indexed for disease.

The diseases and crops on which observations are made are: *Rhizoctonia solani* on tomato, *Fusarium* sp. on cotton, *Thielaviopsis basicola* on pinto beans, and *Pythium ultimum* on sugar beets. Estimates of disease control are expressed on an A–B–C–D basis, A being 75–100% disease control and D being 0–25% control.

The data on a representative series of compounds of the invention are presented in Table I. These data show the high level of activity of these cyanallyl dithiocarbamates.

TABLE I.—TOXICITY OF CYANOALLYL DITHIOCARBAMATES TO SOIL ORGANISMS $$CH_2=C(CN)-CH_2-NH-C(=S)-S-R$$

| R | Conc. in soil, p.p.m. | Fungitoxic rating [1] | | | |
|---|---|---|---|---|---|
| | | Thielaviopsis | Fusarium | Rhizoctonia | Pythium |
| –⟨phenyl⟩ | 25 | A | A | A | A. |
| | 5 | A | A | A | A. |
| | 1.25 | AB | A | AB | A. |
| –⟨phenyl⟩–Cl | 1.25 | B | A | A | A. |
| –⟨phenyl⟩–Br | 25 | A | A | A | |
| | 12 | A | A | A | A. |
| –⟨phenyl–CH$_3$⟩ | 50 | | A | AB | A. |
| | 25 | | A | AB | A. |
| –⟨phenyl–CH(CH$_3$)$_2$⟩ | 25 | A | A | A | A. |
| | 12 | A | A | A | A. |

[1] A–B–C–D rating, A=75%–100% control, B=50%–75% control.

*Example IV.—Effectiveness of cyanoallyl dithiocarbamates on foliage fungi*

The leaves of greenhouse grown cucumber, tomato, bean, potato, wheat, and apple seedlings are sprayed on both the under and upper surfaces with a twin nozzle sprayer. During spraying, the plants are placed on a turntable so as to get an even distribution of the spray over the plant. The test chemicals are diluted from acetone concentrate solutions to give the desired dilution in parts per million.

Following spraying, the plants are allowed to dry. The sprayed plants are then inoculated with the following organisms: potato—*Phytophthora infestans*; wheat—*Puccinia recondita*; apple—*Venturia inaequalis*; tomato—*Alternaria solani*; bean—*Colletotrichum lindemuthianum* and *Uromyces phaseoli*; cucumber—*Erysiphe cichoracearum*. The inoculated plants (except cucumbers) are immediately placed at 100% R.H. and 72° F. for 24 hours. They are then removed to a greenhouse at 80% relative humidity and 70° F.; cucumbers are placed in this greenhouse immediately. Symptoms develop on all plants but apple in 7 days. Apples require about 21 days for symptoms to develop.

Plants are then assessed as to presence or absence of disease.

TABLE II.—DISEASE CONTROL END-POINT OF SOME CYANOALLYL DITHIOCARBAMATES $$CH_2=\overset{CN}{\underset{|}{C}}-CH_2-\overset{H}{\underset{|}{N}}-\overset{S}{\underset{\|}{C}}-S-R$$

| R | End-point in p.p.m. on following organisms [1] | | | | | | |
|---|---|---|---|---|---|---|---|
|  | P.i. | P.r. | U.p. | A.s. | C.l. | E.c. | V.i. |
| —phenyl | 250–500 | 64 | 32 | 500–1000 | 250–500 | 250–500 | |
| —phenyl—Cl | 125–250 | 32–64 | 32 | 125–250 | 125 | | |
| —phenyl—Br | 250 | <250 | | 250 | <250 | <250 | 250 |
| —phenyl(CH₃) | 125–250 | 32–64 | 32 | 125–250 | 125 | | |
| —phenyl(CH(CH₃)₂) | <250 | 250 | | <250 | <250 | <250 | <250 |

[1] P.i.=*Phytophthora infestans*; P.r.=*Puccinia recondita*; U.p.=*Uromyces phaseoli*; A.s.=*Alternaria solani*; C.l.=*Colletotrichum lindemuthianum*; E.c.=*Erysiphe cichoracearum*; V.i.=*Venturia inaequalis*.

For horticultural purposes, the active compounds of the present invention may be used alone or in combination with other fungicidal, viricidal, insecticidal or acaricidal material, with plant nutritives, plant hormones, and the like. If the toxic agents are employed in the form of emulsions or suspensions, for example, in water, solvents such as oils, emulsifiers, emulsion stabilizers, and the like may be added. Materials which suppress phytotoxic action may also be added if desired. For example, glucose is known to protect tomato plants against damage by certain substances having a phytotoxic effect when employed in concentrated form. The compounds of the present invention may be applied by means of spraying. Spraying of the plants to be treated may be performed with aqueous emulsions, solutions, or suspensions of the active agents. The spray liquid is generally applied at a rate of from about 75 to 150 gallons per acre. If spraying is effected with smaller quantities of liquid as in low-volume spraying, high concentrations of the active agents should be employed. Wetting agents and, if necessary or desirable, stickers such as the heavy hydrocarbon oils with a minimum viscosity of 10° Engler at 50° C. can be present. The wetting agent must be non-reactive with the compounds of the present invention. Non-ionic surfactants seem preferable. If desired, a minor amount of the order of about 0.001 to about 0.5% by weight of a wetting agent may be added to aid in forming a suspension in the aqueous medium. Any of the conventional wetting agents can be employed. Particularly suitable wetting agents are the sodium salts of a mixture of secondary heptadecyl sulfate, sold commercially under the names of "Teepol" and polyethylene glycol ethers of alkyl phenols sold under the trade names of "Triton X–100" and "Triton X–155." Preferably concentrated compositions comprising an active compound of the present invention and a suitable wetting agent are prepared, and the concentrate is then dispersed in water prior to use.

A further form in which the fungicidal compounds of the present invention may be applied for horticultural use consists of solutions of the active ingredient in suitable inert liquid or semi-solid diluents in which the active ingredient is present in molecularly dispersed form. The form in which the agents to be employed are applied to the objects treated depends on the nature of the object and the purpose of the application. Suitable inert solvents for the manufacture of liquid preparations should not be readily flammable, as odorless as possible and without any toxic effect on humans and animals when properly used. Neither should they have a corrosive effect on the components of the preparations or the material of the storage vessel. Examples of suitable solvents are high-boiling oils, e.g., oils of vegetable origin, such as castor oil, etc., and lower boiling solvents with a flash point of at least 30° C., such as carbon tetrachloride, ethylene dichloride, acetylene tetrachloride, hydrogenated naphthalene, alkylated naphthalene, sorbent naphtha, etc. Mixtures of solvents may also be used. Non-aromatic petroleum oils and xylene are commonly employed.

For horticultural use the active compounds of the present invention may also be applied in the form of dusts, utilizing as the inert vehicle such materials as tricalcium phosphate, precipitated chalk, bentonite, kaolin, kieselguhr, etc. These compounds may also be employed in the form of aerosols. For this purpose the active ingredient is dissolved or dispersed in a solvent boiling below room temperature at atmospheric pressure.

I claim as my invention:

1. A method of controlling soil fungi which comprises applying to the soil an effective fungicidal quantity of a compound having the formula:

$$CH_2=\overset{CN}{\underset{|}{C}}-CH_2-\overset{H}{\underset{|}{N}}-\overset{S}{\underset{\|}{C}}-S-R$$

wherein R represents a member of the group consisting of unsubstituted aryl of 6–14 carbon atoms and aryl of 6–14 carbon atoms substituted by at least one substituent selected from the group consisting of middle halogen, alkyl of 1–5 carbon atoms, alkoxy of 1–5 carbon atoms, hydroxy, nitro and amino (—NH₂).

2. A method of controlling soil fungi which comprises applying to the soil an effective fungicidal quantity of phenyl (2-cyanoallyl)-dithiocarbamate.

3. A method of controlling soil fungi which comprises applying to the soil an effective fungicidal quantity of para-chlorophenyl (2-cyanoallyl)-dithiocarbamate.

References Cited by the Examiner

UNITED STATES PATENTS 3,234,087   2/1966   Haynes et al. _____ 167—53.1

OTHER REFERENCES

Derwent Farmdoc #10,750, abstracting Belgian Patent #633,277, December 5, 1963.

ALBERT T. MEYERS, *Primary Examiner*.

SAM ROSEN, *Examiner*.

JEROME D. GOLDBERG, *Assistant Examiner*.